US012667791B2

(12) United States Patent
Beatrice et al.

(10) Patent No.: US 12,667,791 B2
(45) Date of Patent: Jun. 30, 2026

(54) SYSTEM AND METHOD FOR INHIBITING MOVEMENT OF SHOTGUN GATE VIA COMPUTER IMPLEMENTED PROCESS

(71) Applicant: UNIVERSAL CITY STUDIOS LLC, Universal City, CA (US)

(72) Inventors: Michael Anthony Beatrice, Orlando, FL (US); Gregory Paul Habiak, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 389 days.

(21) Appl. No.: 18/345,986

(22) Filed: Jun. 30, 2023

(65) Prior Publication Data

US 2025/0001316 A1     Jan. 2, 2025

(51) Int. Cl.
A63G 7/00 (2006.01)
G06K 7/10 (2006.01)

(52) U.S. Cl.
CPC ........... A63G 7/00 (2013.01); G06K 7/10445 (2013.01)

(58) Field of Classification Search
CPC ....... A63G 7/00; A63G 31/00; G06K 7/10445
See application file for complete search history.

(56) References Cited

U.S. PATENT DOCUMENTS

| | | |
|---|---|---|
| 7,758,435 B2 | 7/2010 | Henry et al. |
| 7,905,789 B2 | 3/2011 | Collins et al. |
| 8,079,916 B2 | 12/2011 | Henry |
| 10,407,965 B2 | 9/2019 | Alford et al. |
| 11,952,020 B1 * | 4/2024 | Beatrice ................. B61K 13/04 |
| 2019/0347911 A1 | 11/2019 | Linguanti et al. |
| 2020/0039795 A1 * | 2/2020 | Hsu ........................ B66B 1/3476 |
| 2021/0062567 A1 | 3/2021 | Majdali et al. |

FOREIGN PATENT DOCUMENTS

| | | |
|---|---|---|
| EP | 2607197 A1 | 6/2013 |
| EP | 3493115 A1 | 6/2019 |
| JP | S62284683 A | 12/1987 |

OTHER PUBLICATIONS

PCT/US2024/035911 International Search Report and Written Opinion mailed Oct. 14, 2024.

* cited by examiner

*Primary Examiner* — Amr A Awad
(74) *Attorney, Agent, or Firm* — Fletcher Yoder, P.C.

(57) ABSTRACT

Aspects of the disclosure relate to methods, apparatus, and systems for controlling movement of a shotgun gate in a ride system. A system is configured to identify one or more ride vehicles stopped at a platform, the platform including one or more shotgun gates respectively corresponding to one or more rows of the one or more ride vehicles, determine which row(s) of the one or more rows is in-service or out-of-service based on an identity of the one or more ride vehicles, instruct to remain closed at least one shotgun gate of the one or more shotgun gates corresponding to at least one row of the one or more rows determined to be out-of-service, and instruct to open any other shotgun gate of the one or more shotgun gates corresponding to at least one other row of the one or more rows determined to be in-service.

20 Claims, 6 Drawing Sheets

HUMAN MACHINE INTERFACE

STATUS

| | FIRST ROW | SECOND ROW | ... | M-th ROW |
|---|---|---|---|---|
| FIRST RIDE VEHICLE *104* | FIRST ROW 124 | SECOND ROW 126 | ... | M-th ROW |
| SECOND RIDE VEHICLE *106* | FIRST ROW 134 | SECOND ROW 136 | ... | M-th ROW |
| THIRD RIDE VEHICLE *118* | FIRST ROW 144 | SECOND ROW 146 | ... | M-th ROW |
| ... | FIRST ROW | SECOND ROW | ... | M-th ROW |
| N-th RIDE VEHICLE | FIRST ROW | SECOND ROW | ... | M-th ROW |

SYSTEM AND METHOD FOR INHIBITING MOVEMENT OF SHOTGUN GATE VIA COMPUTER IMPLEMENTED PROCESS

TECHNICAL FIELD

The technology discussed below relates generally to gate systems, and more particularly, to inhibiting movement of a shotgun gate.

INTRODUCTION

Theme park ride attractions may use gate systems to control crowd flow and access to such attractions. Some gate systems may employ actuators (e.g., hydraulic actuators, magnetic actuators, electric actuators) as power sources to generate a force to open and close the gates. Typically, for some ride attractions (e.g., roller coasters) where a ride vehicle includes one or more rows of seats, a shotgun gate system may be used to control how passengers enter the rows. In the shotgun gate system, gates respectively corresponding to the rows are actuated to open and/or close at the same time. However, problems may arise due to an individual gate not being able to open or close independent of the other gates.

For example, when one or more seats of an individual row on a ride vehicle is out-of-service but the rest of the seat rows are otherwise in-service to the passengers, a ride operator and/or technician (e.g., ride technician) may implement a procedure to prevent passengers from sitting in an out-of-service seat of an out-of-service row. The procedure may include the ride operator and/or technician locking (e.g., strapping down) in a closed position a restraint system of the out-of-service seat and/or placing a physical barrier on the restraint system to prevent the restraint system from opening, and therefore, prevent a passenger from sitting in the out-of-service seat. The procedure may further include the ride operator and/or technician monitoring the passengers as they board the ride vehicle and preventing a passenger from entering the out-of-service row and/or sitting in the out-of-service seat. However, because the shotgun gate system operates in a way that all gates are actuated to open at the same time, a gate corresponding to the out-of-service row will always open and may prompt a passenger to enter the out-of-service row. If the ride operator and/or technician does not notice the passenger enter the out-of-service row, the passenger may unlock the restraint system from the closed position (and/or remove the physical barrier on the restraint system) and sit in the out-of-service seat.

Accordingly, what is needed is a system and method for controlling a shotgun gate that prevents a passenger from accessing an out-of-service row of a ride vehicle. The present disclosure is directed to controlling a ride system to open and close an individual gate (e.g., gate corresponding to an out-of-service row of a ride vehicle) independent of other gates in the system.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to methods, apparatus, and systems for controlling movement of a shotgun gate in a ride system. A ride system may include one or more ride vehicles including one or more seat rows, a passenger loading platform including one or more shotgun gates respectively corresponding to the one or more seat rows, a ride vehicle identifier configured to identify the one or more ride vehicles stopped at the passenger loading platform, and a controller communicatively coupled to the one or more shotgun gates and the ride vehicle identifier. The controller may be configured to determine which seat row or rows of the one or more seat rows is in-service or out-of-service based on data corresponding to an identity of the one or more ride vehicles. The controller may be configured to instruct to remain closed at least one shotgun gate of the one or more shotgun gates corresponding to at least one seat row of the one or more seat rows determined to be out-of-service if any seat row of the one or more seat rows are determined to be out-of-service. The controller may be configured to instruct to open any other shotgun gate of the one or more shotgun gates corresponding to at least one other seat row of the one or more seat rows determined to be in-service if any seat row of the one or more seat rows are determined to be in-service. The ride system may further include an interface device communicatively coupled to the controller, wherein the interface device is configured to receive the data corresponding to the identity of the one or more ride vehicles from a ride system operator (e.g., ride operator) and/or technician (e.g., ride system technician, ride technician), wherein the data corresponding to the identity of the one or more ride vehicles is received prior to the one or more ride vehicles stopping at the passenger loading platform, wherein the data corresponding to the identity of the one or more ride vehicles may indicate if one or more seat rows are in-service and/or if one or more seat rows are out-of-service and/or which seat row or rows of the one or more seat rows is in-service and/or which seat row or rows of the one or more seat rows are out-of-service, and wherein the controller is configured to receive the data corresponding to the identity of the one or more ride vehicles via the interface device. Other aspects, embodiments, and features are also claimed and described.

In one example, a method of controlling movement of a shotgun gate in a ride system is disclosed. The method includes identifying one or more ride vehicles stopped at a passenger loading platform, the one or more ride vehicles including one or more seat rows and the passenger loading platform including one or more shotgun gates respectively corresponding to the one or more seat rows, determining which, if any, seat row or rows of the one or more seat rows is in-service and/or which, if any, seat row or rows are out-of-service based on data corresponding to an identity of the one or more ride vehicles, instructing, if any seat rows of the one or more seat rows are determined to be out-of-service, to remain closed at least one shotgun gate of the one or more shotgun gates corresponding to at least one seat row of the one or more seat rows determined to be out-of-service, and instructing, if any seat rows of the one or more seat rows are determined to be in-service, to open any other shotgun gate of the one or more shotgun gates corresponding to at least one other seat rows of the one or more seat rows determined to be in-service. The method may further include receiving the data corresponding to the identity of the one or more ride vehicles prior to the one or more ride vehicles stopping at the passenger loading platform, wherein the data corresponding to the identity of the one or more ride vehicles indicates which seat row or rows, if any, of the one or more seat rows of the one or more ride vehicles is in-service and/or which seat row or rows, if any, of the one or more seat rows of the one or more ride vehicles is out-of-service.

In one example, a controller for instructing movement of a shotgun gate in a ride system comprises at least one processor. The at least one processor is configured to identify one or more ride vehicles stopped at a passenger loading platform, the one or more ride vehicles including one or more seat rows and the passenger loading platform including one or more shotgun gates respectively corresponding to the one or more seat rows, determine which seat row or rows of the one or more seat rows is in-service, if any, and/or out-of-service, if any, based on data corresponding to an identity of the one or more ride vehicles, instruct to remain closed at least one shotgun gate of the one or more shotgun gates corresponding to at least one seat row of the one or more seat rows determined to be out-of-service, if any, and/or instruct to open any other shotgun gate of the one or more shotgun gates corresponding to at least one other seat row of the one or more seat rows determined to be in-service, if any. The at least one processor may be further configured to receive the data corresponding to the identity of the one or more ride vehicles prior to the one or more ride vehicles stopping at the passenger loading platform, wherein the data corresponding to the identity of the one or more vehicles indicates which seat row or rows of the one or more seat rows is in-service, if any, and/or wherein the data corresponding to the identity of the one or more vehicles indicates which seat row or rows of the one or more seat rows is out-of-service, if any.

BRIEF DESCRIPTION OF THE DRAWINGS

FIG. 3 illustrates an example of a human machine interface (HMI) for receiving and displaying ride vehicle data in accordance with various aspects of the disclosure.

DETAILED DESCRIPTION

Figure 1:
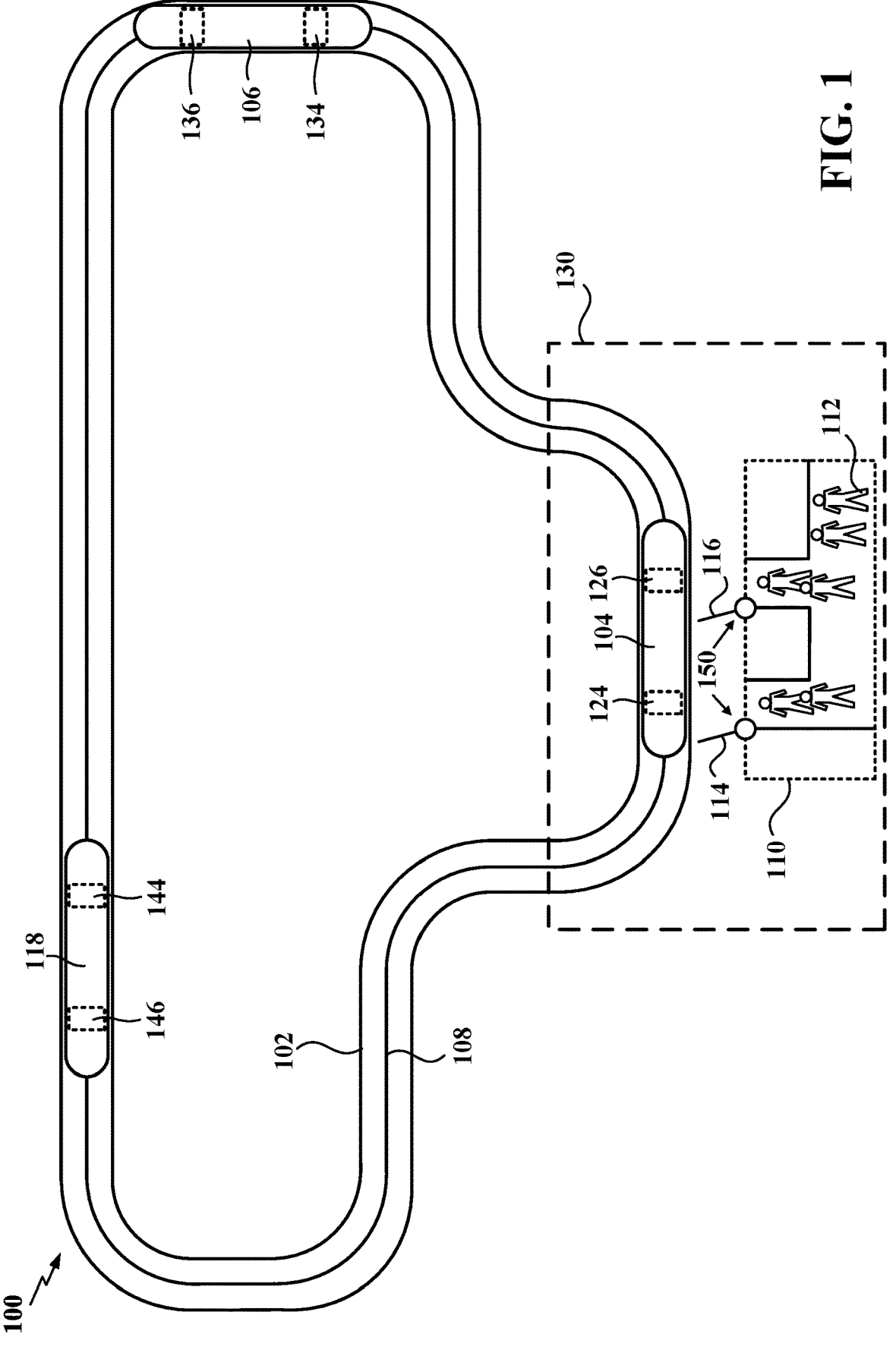
FIG. 1 is a top view of an example ride system in accordance with various aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

The present disclosure is directed to a system and method of controlling a shotgun gate of a ride system. In an aspect, a controller may prevent a passenger from accessing an out-of-service row of a ride vehicle by instructing independently opening and/or closing of an individual shotgun gate corresponding to the out-of-service row as opposed to instructing opening and/or closing of all shotgun gates at the same time. In an aspect, the controller may be configured to monitor for data corresponding to when a row of the ride vehicle is out-of-service and instruct that an individual shotgun gate associated with the out-of-service row remains closed (while opening one or more other shotgun gates) when the ride vehicle arrives at a passenger loading platform, thus blocking the passenger from entering the out-of-service row.

The controller of the present disclosure may instruct that the shotgun gate corresponding to the out-of-service row to not open, thus inhibiting a passenger from approaching, let alone accessing, the out-of-service row. This may prevent the passenger from approaching the out-of-service row entirely. It may be desirable to place a row out-of-service for at least one of a variety of reasons. For example it may be desirable to keep a row empty to control a weight distribution on a ride vehicle (e.g., partially loading a ride vehicle). Changing a weight distribution of a ride vehicle may allow for changed or reduced wear (e.g., reduced wear in certain portions of a ride vehicle, reduced wear throughout the entire ride vehicle, reduced wear on the infrastructure (e.g., ride path (e.g. track, flume), brakes, acceleration systems) or allow for modifying passenger experience while riding a ride vehicle (e.g., placing more weight in certain areas of a ride vehicle may minimize or maximize the chance passengers may get splashed and/or wet on a ride, changing weight placement throughout a rollercoaster train may alter momentum throughout the ride experience, changing weight distribution may alter what parts of a ride path a passenger may experience, or which ride path of a plurality of ride paths a passenger may experience). Further, if it is determined that completely filling a ride vehicle would exceed a desired total weight (e.g., weight limit) of a loaded vehicle, it may be desirable to put a row out-of-service to prevent passengers from boarding a row of the ride vehicle. It may also be desirable to place a row out-of-service if a seat in the row requires maintenance. This may allow passenger throughput of a ride to continue (e.g., at a reduced rate) until at least one seat in a threshold number of rows of a ride vehicle requires maintenance (e.g., and the entire ride vehicle is removed from service (e.g., pulled from service) during operating hours) or until after operating hours and no passenger throughput is desired. Additionally, it may be desirable to place a row out of service if an out-of-service triggering event is detected by a sensor system. An out of service triggering event may comprise an event that may require inspection and/or maintenance (e.g., a threshold number of cycles completed) of a ride vehicle seat and/or row of a particular ride vehicle or even an entire ride vehicle. An out-of-service triggering event may also comprise a detected malfunction, detected damage, detected possible damage, and/or a detected possible malfunction. After an out-of-service triggering event is detected, an inspection may be performed to confirm if any maintenance (e.g., repair, replacement) of any components (e.g., restraints, special effects, speakers, lights) of the seat, row, and/or ride vehicle may be necessary. Additionally, it may be desirable to place a row or rows out-of-service to allow for certification runs for a seat and/or row of a ride vehicle and/or a ride vehicle of a system of ride vehicles that all board at the same time at the same platform. Further, it may be desirable to keep a row out-of-service if testing equipment is installed in or on one or more seats of that row. It may also be desirable to place a row out-of-service if the row is an accommodation row that is not actively being used and/or needed. An accommodation row may be a row designed to accommodate passengers of certain sizes (e.g., certain heights (e.g., relatively taller or shorter), certain widths (e.g., relatively greater widths, relatively lesser widths) or weights (e.g., relatively greater weights, relatively lesser weights)). An accommodation row may also be a row designed for passengers that may have additional needs or require additional assistance (e.g., wheelchair accommodations (e.g., allowing a wheelchair onto the ride vehicle, transferring passengers from a wheelchair onto a seat of the accommodation row of the ride vehicle)). For the above reasons and/or similar reasons, it may be desirable to make a seat of a row out-of-service. Further, an out-of-service row may comprise any row of a ride vehicle having one or more out-of-service seats. An in-service row may comprise any row of a ride vehicle having only in-service seats (e.g., seats that are not out-of-service).

FIG. 1 is a top view of an example ride system 100 in accordance with various aspects of the disclosure. The ride system 100 may include a path 102 and one or more ride vehicles configured to move along the path 102. As shown in FIG. 1, a first ride vehicle 104 is stopped on the path 102 near a passenger loading platform 110. Other ride vehicles, such as a second ride vehicle 106 and a third ride vehicle 118, may simultaneously travel along the path 102 while the first ride vehicle 104 is stopped. In some aspects of the disclosure, the path 102 may include one or more tracks or guide rails, such as the center guide rail 108 shown in FIG. 1, for guiding and/or moving a ride vehicle along the path 102.

The passenger loading platform 110 provides an area for passengers 112 to queue before boarding one of the ride vehicles. In an aspect, the ride system 100 may include a shotgun gate system 150 configured to control the flow of passengers 112 boarding the one or more ride vehicles. The shotgun gate system 150 may include one or more shotgun gates respectively corresponding to one or more rows of seats available on a ride vehicle. As shown in FIG. 1, a first shotgun gate 114 is configured to control a flow of passengers intending to board a first seat row 124 of the first ride vehicle 104 and a second shotgun gate 116 is configured to control a flow of passengers intending to board a second seat row 126 of the first ride vehicle 104. In an aspect, the shotgun gate system 150 may be configured to actuate all shotgun gates to open and/or close at the same time, such as when the ride vehicle is stopped near the platform 110. In the example shown in FIG. 1, the first shotgun gate 114 and the second shotgun gate 116 are simultaneously opened to allow the passengers 112 to enter the seat rows of the first ride vehicle 104.

Figure 2:
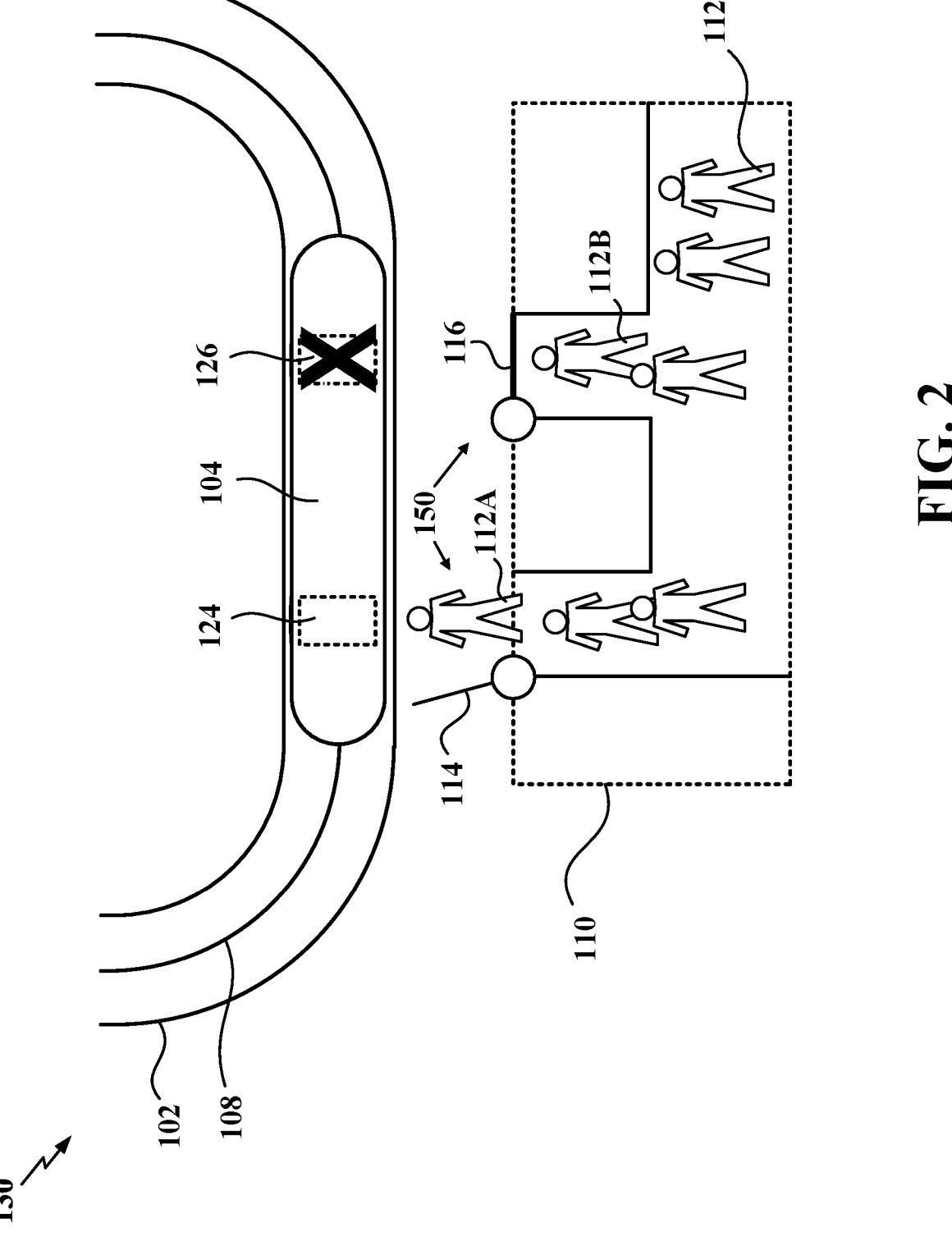
FIG. 2 is an expanded view of a region of the example ride system depicted in FIG. 1 configured to inhibit movement of a shotgun gate in accordance with various aspects of the disclosure.

FIG. 2 is an expanded view of a region 130 of the example ride system 100 depicted in FIG. 1 configured to inhibit movement of a shotgun gate in accordance with various aspects of the disclosure. In an aspect, one or more seats of a seat row of a ride vehicle may be out-of-service for one reason or various reasons. Accordingly, a ride operator or technician may implement a procedure to prevent passengers from sitting in an out-of-service seat of an out-of-service row.

As shown in FIG. 2, one or more seats of the second seat row 126 of the first ride vehicle 104 are out-of-service. As part of the procedure, the ride operator and/or technician may lock (e.g., strap down) a restraint system of an out-of-service seat of the second seat row 126 in a closed position to prevent the restraint system from opening, and therefore, prevent a passenger from sitting in the out-of-service seat. Additionally or alternatively, the ride operator or technician may place a physical barrier on the restraint system, the second seat row 126, and/or the out-of-service seat to prevent the passenger from sitting in the out-of-service seat. For example, the ride operator and/or technician may bag or block the out-of-service seat or row to prevent the passenger from sitting. The procedure may further include the ride operator and/or technician monitoring passengers as they board ride vehicles and preventing a passenger from entering an out-of-service row (e.g., second seat row 126) and/or sitting in the out-of-service seat.

In an aspect, while one or more seats of a seat row (e.g., second seat row 126) of a ride vehicle is out-of-service, therefore making the seat row out-of-service, other seat rows may be in-service to the passengers. As shown in FIG. 2, all seats of the first seat row 124 of the first ride vehicle 104 are in-service, therefore making the first seat row 124 in-service. As further shown in FIG. 2, one or more seats of the second seat row 126 of the first ride vehicle 104 is out-of-service, therefore making the second seat row out-of-service. In an aspect, when the first ride vehicle 104 is stopped on the path 102 near the passenger loading platform 110, the shotgun gate system 150 may control (e.g., instruct) the first shotgun gate 114 to open to allow a first passenger 112A to enter the first seat row 124 having all in-service seats while controlling (e.g., instructing) the second shotgun gate 116 to remain closed to prevent a second passenger 112B from approaching the first ride vehicle 104 and entering the out-of-service second seat row 126 having one or more out-of-service seats.

FIG. 3 illustrates an example of a human machine interface (HMI) 300 for receiving and displaying ride vehicle data in accordance with various aspects of the disclosure. The HMI 300 may include a screen 302 configured to display status data of ride vehicles operating in the ride system. As shown in FIG. 3, the HMI 300 may display data related to a first ride vehicle up to an N-th ride vehicle, where N is an integer greater than 1 (N>1). A maximum value of N may depend on a maximum capacity of ride vehicles capable of being operated in the ride system. In the example of FIG. 3, the data displayed on the HMI 300 includes data for the first ride vehicle 104, the second ride vehicle 106, and the third ride vehicle 118 shown in FIG. 1. In an aspect, the ride vehicles may be displayed and/or listed on the HMI 300 according to a vehicle identification attribute (e.g., radio frequency identification (RFID) tag, bar code, quick response (QR) code, image, retroreflective pattern, light pulse pattern, color, and/or ride vehicle count) assigned to each ride vehicle.

In an aspect, the HMI 300 displays status data of each seat row of a ride vehicle. For example, the status data may include an indication of whether a seat row of a ride vehicle is in-service or out-of-service. As shown in FIG. 3, the HMI 300 may display status data of a first seat row up to an M-th seat row of a ride vehicle, where M is an integer greater than 1 (M>1). A maximum value of M may depend on a maximum number of seat rows present in the ride vehicle. In the example of FIG. 3, the status data displayed on the HMI 300 includes status data for the first seat row 124 and the second seat row 126 of the first ride vehicle 104, status data for a first seat row 134 and a second seat row 136 of the second ride vehicle 106, and status data for a first seat row 144 and a second seat row 146 of the third ride vehicle 118.

In an aspect, a status of a seat row may be indicated on the HMI 300 via color. In particular, a field corresponding to a seat row of a ride vehicle may be shown in different colors on the HMI 300 based on whether the seat row is in-service or out-of-service. For example, regarding the first ride vehicle 104, the first seat row 124 may be in-service and the second seat row 126 may be out-of-service. Accordingly, as shown in FIG. 3, the HMI 300 may display a field corresponding to the first seat row 124 in a clear or white color to indicate that the first seat row 124 is in-service and display a field corresponding to the second seat row 126 in a gray color to indicate that the second seat row 126 is out-of-service. Similarly, regarding the second ride vehicle 106, the first seat row 134 and the second seat row 136 may both be in-service. Therefore, the HMI 300 may display a field corresponding to the first seat row 134 and a field corresponding to the second seat row 136 in a clear or white color to indicate that both the first seat row 134 and the second seat row 136 of the second ride vehicle 106 are in-service. In an aspect, the colors depicting a status of a seat row (e.g., whether a seat row is in-service or out-of-service) may not be limited to the colors clear/white and gray. It is contemplated that any color, or combination of colors, may be used to depict the status of the seat row. For example, the colors green and/or blue may be used to depict that the seat row is in-service and the colors yellow and/or red may be used to depict that the seat row is out-of-service.

In an aspect, a status of a seat row may be indicated on the HMI 300 by a visual mark. In particular, a field corresponding to a seat row of a ride vehicle may be shown to have a distinguishing mark on the HMI 300 (e.g., check mark, pattern design, or any other mark suitable for distinguishing the field) based on whether the seat row is in-service or out-of-service. For example, regarding the third ride vehicle 118, the first seat row 144 may be out-of-service and the second seat row 146 may be in-service. Accordingly, as shown in FIG. 3, the HMI 300 may display a field corresponding to the first seat row 144 with cross-hatching to indicate that the first seat row 144 is out-of-service. Notably, the HMI 300 may display a field corresponding to the second seat row 146 without any marks to indicate that the second seat row 146 is in-service.

In an aspect, the HMI 300 may be configured to receive input from a ride operator and/or technician. Accordingly, if the ride operator and/or technician determines that a seat row of a ride vehicle is out-of-service (e.g., upon inspection of the seat row), the ride operator and/or technician may update the HMI 300 with the determined status of the seat row. In an aspect, the screen 302 of the HMI 300 may be a touchscreen responsive to the ride operator's/technician's touch. Therefore, the rider operator and/or technician may press a field on the screen 302 corresponding to the out-of-service seat row (e.g., second seat row 126 of the first ride vehicle 104 and/or first seat row 144 of the third ride vehicle 118) to change a color of the field and/or add a distinguishing mark to the field and/or change a distinguishing mark of the field and/or remove a distinguishing mark from the field to indicate that the corresponding seat row is out-of-service. Later, if the seat row of the ride vehicle is back in service (e.g., determined to be back in-service), the ride operator and/or technician may again press the field on the screen 302 corresponding to the out-of-service seat row to change the color of the field (e.g., back to its original state (e.g., original color)) and/or add a distinguishing mark to the field and/or change a distinguishing mark of the field and/or remove a distinguishing mark from the field to indicate that the corresponding seat row is in-service. In an aspect, the screen 302 may not be a touchscreen responsive to the ride operator's and/or technician's touch. As such, the HMI 300 may be configured to receive inputs from the ride operator and/or technician via other types of input devices, such as a keypad, a keyboard, a mouse, or any combination thereof.

Figure 4:
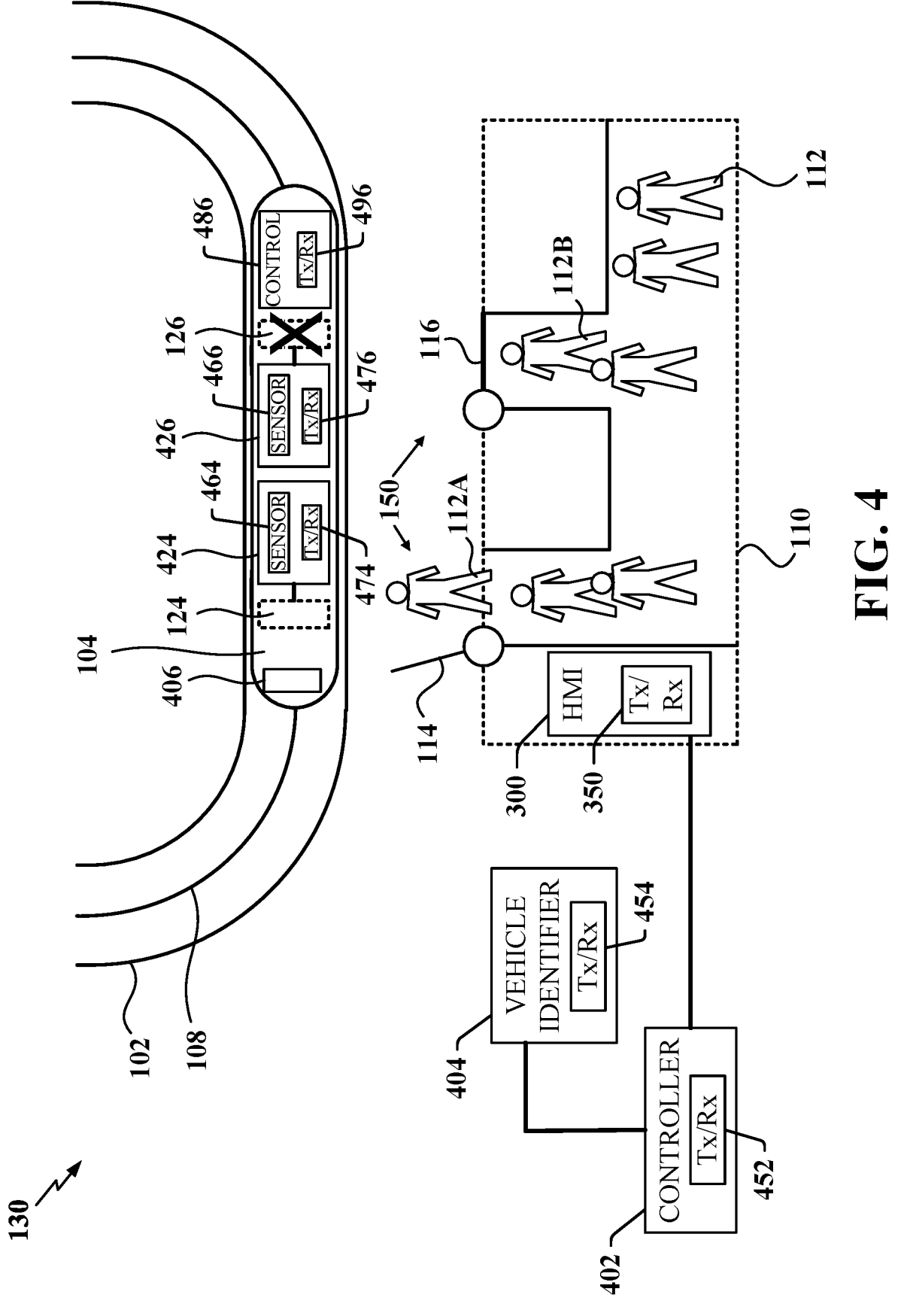
FIG. 4 is an expanded view of a region of the example ride system depicted in FIG. 1 implementing a controller configured to inhibit movement of a shotgun gate in accordance with various aspects of the disclosure.

FIG. 4 is an expanded view of a region 130 of the example ride system 100 depicted in FIG. 1 implementing a controller configured to inhibit movement of a shotgun gate in accordance with various aspects of the disclosure. The ride system may include a controller 402, a ride vehicle identifier 404, one or more unique identification (ID) attributes 406, the HMI 300 described above with respect to FIG. 3, and a shotgun gate system 150 comprising one or more shotgun gates (e.g., first shotgun gate 114 and second shotgun gate 116) configured to control the flow of passengers 112 boarding a ride vehicle (e.g., first ride vehicle 104). The controller 402 may be coupled to the ride vehicle identifier 404, the HMI 300, and/or the one or more shotgun gates via a wired or wireless connection.

In an aspect, the controller 402 may be configured to determine a status of each seat row (e.g., whether the seat row is in-service or out-of-service) of each ride vehicle in the ride system based on inputs received from the ride operator and/or technician via the HMI 300. The HMI 300 may include or be coupled to one or more transmitters, receivers, and/or transceivers 350 configured to communicate with one or more transmitters, receivers, and/or transceivers 452 of the controller 402. Accordingly, when the HMI 300 receives data indicating whether a seat row of a particular ride vehicle is in-service or out-of-service from the ride operator and/or technician, the HMI 400 may directly transfer the data to the controller 402. Upon being signaled that a seat row of a particular ride vehicle is out-of-service, the controller 402 may instruct a shotgun gate corresponding to the out-of-service seat row to remain closed while instructing any shotgun gates corresponding to an in-service seat row to open.

Additionally or alternatively, the controller 402 may be configured to communicate (e.g., via a wired or wireless connection) with one or more sensor systems (e.g., first sensor system 424 and second sensor system 426), wherein the sensor systems may comprise one or more sensors (e.g., first sensor 464 and second sensor 466) and communication circuitry (e.g., wired communication circuitry, wireless communication circuitry (e.g., transmitters, receivers, and/or transceivers 474, 476)). A sensor (e.g., light sensor, sound sensor, vibration sensor, displacement sensor, temperature sensor, strain sensor, force sensor, pressure sensor, camera) of the one or more sensor systems may be configured to autonomously detect data indicative of an out-of-service triggering event (e.g., inputs indicating it is time for maintenance or inspection (e.g., threshold number of cycles completed), threshold temperature reached, threshold displacement (e.g., of a component) reached, threshold strain (e.g., of a component) reached, threshold force and/or pressure reached, threshold vibration and/or sound level reached, detected malfunction, detected potential malfunction, detected damage, detected potential damage) of a ride vehicle seat and/or row of a particular ride vehicle or entire ride vehicle. As such, the controller 402 may also receive data indicative of an out-of-service triggering event of a seat row of a particular ride vehicle based on a direct signal from the one or more sensor systems. For example, the one or more sensor systems may be mounted on a ride vehicle seat, a seat row, a surface of the ride vehicle, and/or anywhere along the path 102 within a detecting range of a ride vehicle, ride vehicle seat, or ride vehicle row. The one or more sensor systems may include or be coupled to communication circuitry, such as one or more transmitters, receivers, and/or transceivers 474, 476 and may be configured to communicate with the one or more transmitters, receivers, and/or transceivers 452 of the controller 402. Accordingly, when the one or more sensors detects data indicative of an out-of-service triggering event of the ride vehicle seat or row, or entire ride vehicle, then the one or more sensor systems may directly communicate the data indicative of the out-of-service triggering event to the controller 402. Upon receiving of data indicative of an out-of-service triggering event of a ride vehicle seat, the controller 402 may determine that the ride vehicle seat is out-of-service, resulting in the seat row corresponding to the out-of-service seat also being out-of-service. The controller 402 may then instruct a shotgun gate corresponding to the out-of-service seat row to remain closed and may instruct any shotgun gates corresponding to an in-service seat row to open. Upon receiving data indicative of an out-of-service triggering event of a ride vehicle row, the controller 402 may determine that the ride vehicle row is out-of-service. The controller 402 may then instruct a shotgun gate corresponding to the out-of-service seat row to remain closed and may instruct any shotgun gates corresponding to an in-service seat row to open. Upon receiving data indicative of an out-of-service triggering event of a ride vehicle, the controller 402 may determine that all rows of the ride vehicle row are out-of-service. The controller 402 may then instruct shotgun gates corresponding to the out-of-service rows to remain closed.

In an embodiment, a controller determining that a seat is out-of-service may instruct a shotgun gate corresponding to a group of seats containing the out-of-service seat to remain closed while instructing any shotgun gates corresponding to a group of seats wherein all seats in that corresponding group of seats are in-service to open (e.g., without having to make a separate determination that a row is out-of-service). Further, in an embodiment, a controller determining that a seat is out-of-service may instruct a shotgun gate corresponding to that seat to remain closed while instructing any shotgun gates corresponding to seats wherein all seats corresponding to said shotgun gates are in-service to remain open.

In an aspect, all ride vehicles in the ride system may be uniquely identified from each other by the controller 402 via the ride vehicle identifier 404. For example, each ride vehicle may be assigned a unique identification attribute 406, such as a unique identification (ID) tag (e.g., RFID tag, bar code, QR code). Accordingly, the ride vehicle identifier 404 may be configured as an ID tag reader (e.g., RFID reader, bar code reader, QR code reader) and the controller 402 may identify a ride vehicle based on the unique ID tag read by the ride vehicle identifier 404 and communicated to the controller 402.

In another example, the unique identification attribute 406 of a ride vehicle may be one or more surfaces of the ride vehicle displaying a unique image, color, and/or unique retroreflective pattern (e.g., reflected infrared light). Accordingly, the ride vehicle identifier 404 may comprise one or more cameras configured to capture and/or recognize the unique image, unique color, and/or unique retroreflective pattern and the controller 402 may identify the ride vehicle based on the image, unique color, and/or unique retroreflective pattern captured and/or recognized by the ride vehicle identifier 404 and communicated to the controller 402.

In a further example, the unique identification attribute 406 of a ride vehicle may emit unique light pulses (e.g., infrared light pulses, specifically and/or uniquely timed light pulses) and/or specific colored light. Accordingly, the ride vehicle identifier 404 may comprise one or more light sensors configured to read and/or recognize the unique light pulses and/or specific colored light. Additionally or alternatively, the ride vehicle may comprise one or more cameras configured to read and/or recognize the unique light pulses and/or specific colored light, and the controller 402 may identify the ride vehicle based on the unique light pulses and/or specific colored light read and/or recognized by the ride vehicle identifier 404 and communicated to the controller 402. The one or more light sensors may comprise one or more color sensors.

In another example, the controller 402 may identify a ride vehicle using a counting mechanism. Here, the ride vehicle identifier 404 may be configured as a ride vehicle counter configured to count the number of ride vehicles passing through an observation range of the ride vehicle identifier 404. Based on a known number of ride vehicles operating in the ride system 100, the controller 402 may identify the ride vehicle according to the number of ride vehicles counted by the ride vehicle identifier 404. For example, if the number of known ride vehicles operating in the system 100 is 3 and if a ride vehicle currently counted by the ride vehicle identifier 404 is determined to have at least one out-of-service seat resulting in an out-of-service row, then the controller 402 may identify that every third ride vehicle counted by the ride vehicle identifier 404 after the currently counted ride vehicle is the ride vehicle having at least one out-of-service row.

In an aspect, the ride vehicle identifier 404 may include and/or be coupled to one or more transmitters, receivers, and/or transceivers 454 configured to communicate with the one or more transmitters, receivers, and/or transceivers 452 of the controller 402. Accordingly, when the ride vehicle identifier 404 captures and/or identifies a unique identification attribute 406 (e.g., unique ID tag (e.g., RFID tag, bar code, QR code), image, color, retroreflective pattern, light pulse pattern, and/or ride vehicle count) of a ride vehicle as described above, the ride vehicle identifier 404 may directly signal the identification attribute to the controller 402. Upon identifying a particular ride vehicle based on the identification attribute, the controller 402 may determine whether any seat rows of the identified ride vehicle are out-of-service. If so, the controller 402 may instruct a shotgun gate corresponding to an out-of-service seat row to remain closed while instructing any shotgun gates corresponding to an in-service seat row to open.

In an embodiment, the ride system may further include an on-board controller 486 located on board a ride vehicle. The on-board controller 486 may include or be coupled to communication circuitry, such as one or more transmitters, receivers, and/or transceivers 496 and may be configured to communicate with the one or more transmitters, receivers, and/or transceivers 474, 476 of the one or more sensor systems 424, 426. Accordingly, the on-board controller 486 may track which seats or seat rows are in-service and/or out-of-service by communicating with a sensor system (e.g., first sensor system 424 or second sensor system 426) corresponding to a particular seat. For example, data received from the sensor systems indicating which seats are in-service and/or out-of-service may be used by the on-board controller 486 to determine which seat rows are in-service and/or out-of-service. Moreover, the communication circuitry (e.g., the one or more transmitters, receivers, and/or transceivers 496) of the on-board controller 486 may be configured to communicate with the one or more transmitters, receivers, and/or transceivers 452 of the controller 402. Accordingly, after determining which seat rows are in-service and/or out-of-service, the on-board controller 486 may communicate the determination to the controller 402.

In an embodiment, each seat row of a ride vehicle (e.g., first seat row 124 and second seat row 126) may include a seat row controller that tracks which seats in a corresponding row are in-service and/or out-of-service, and thereafter, determines whether the corresponding row is in-service and/or out-of-service. The seat row controller may include or be coupled to communication circuitry, such as one or more transmitters, receivers, and/or transceivers and may be configured to communicate with the one or more transmitters, receivers, and/or transceivers 452 of the controller 402. Accordingly, after determining whether a corresponding row is in-service and/or out-of-service, the seat row controller may communicate the determination directly to the controller 402. In an aspect, the communication circuitry (e.g., the one or more transmitters, receivers, and/or transceivers) of the seat row controller may be configured to communicate with the one or more transmitters, receivers, and/or transceivers 496 of the on-board controller 486. Accordingly, after determining whether a corresponding row is in-service and/or out-of-service, the seat row controller may first communicate the determination to the on-board controller 486, which may then communicate the determination to the controller 402.

In an embodiment, the above-described seat sensor systems (e.g., first sensor system 424 and second sensor system 426) may communicate (e.g., via the one or more transmitters, receivers, and/or transceivers 474, 476) data indicative of an out-of-service triggering event of a ride vehicle seat or row, or entire ride vehicle, to the one or more unique identification (ID) attributes 406 (e.g., unique ID tag), which may then pass the data to the ride vehicle identifier 404. For example, the one or more unique ID attributes 406 may receive the data from the sensor systems if the one or more unique ID attributes 406 is an RFID card that is rewritten and/or updated based on seat status. In another example, the one or more unique ID attributes 406 may be one or more light pulses capable of being augmented. Accordingly, the one or more unique ID attributes 406 may include or be coupled to a light pulse system that augments the one or more light pulses based on the data received from the sensor systems, e.g., the one or more light pulses may be augmented to account for all possible seat and/or row statuses in addition to vehicle identification. In an aspect, the light pulse system may include a controller to receive the data and augment the one or more light pulses accordingly. In an aspect, additionally and/or alternatively to the seat sensor systems communicating the data indicative of the out-of-service triggering event of the ride vehicle seat or row, or the entire ride vehicle, to the controller 402, the data may be communicated by the on-board controller 486 and/or the seat row controller described above. In an aspect, the seat sensor systems may directly communicate (e.g., via the one or more transmitters, receivers, and/or transceivers 474, 476) the data indicative of the out-of-service triggering event of the ride vehicle seat or row, or the entire ride vehicle, to the one or more transmitters, receivers, and/or transceivers 454 of the ride vehicle identifier 404.

In an embodiment, the above-described seat sensor systems (e.g., first sensor system 424 and second sensor system 426) may communicate (e.g., via the one or more transmitters, receivers, and/or transceivers 474, 476) data indicative of an out-of-service triggering event of a ride vehicle seat or row, or entire ride vehicle, to the one or more transmitters, receivers, and/or transceivers 350 of the HMI 300, which may then pass the data to the controller 402. For example, the HMI 300 may automatically update and display out-of-service rows based on the data received from the sensor systems. In an aspect, the HMI 300 may include a controller to process the data received from the sensor systems. For example, if the HMI 300 receives data indicating that a particular seat is out-of-service (as opposed to receiving data indicating that a row corresponding to the particular seat is out-of-service), then the controller of the HMI 300 may process the seat data to logically conclude that an out-of-service seat indicates that that the row corresponding to the out-of-service seat is also out-of-service. In an aspect, additionally and/or alternatively to the seat sensor systems communicating the data indicative of the out-of-service triggering event of the ride vehicle seat or row, or the entire ride vehicle, to the HMI 300, the data may be communicated by the on-board controller 486 and/or the seat row controller described above.

An example identifying technique using the unique ID attribute 406 comprising a unique ID tag will now be described in more detail. A unique ID tag may be mounted to a surface of a ride vehicle. For example, the first ride vehicle 104, the second ride vehicle 106, and the third ride vehicle 118 may each be assigned a unique ID tag mounted to a surface thereof. Accordingly, the controller 402 may identify a particular ride vehicle based on the unique ID tag using the ride vehicle identifier 404. In an aspect, the ride vehicle identifier 404 may be located on or near the passenger loading platform 110. As a ride vehicle arrives at the platform 110, the ride vehicle identifier 404 (e.g., ID tag reader (e.g., radio frequency identification (RFID reader))) may read the unique ID tag mounted to the ride vehicle and provide the data relayed from the unique ID tag to the controller 402. In an aspect, the ride vehicle identifier 404 may transmit (via a transmitter or transceiver 454) a signal corresponding to the data relayed from the unique ID tag that will be received (via a receiver or transceiver 452) by the controller 402. Based on the received signal corresponding to the data relayed from the unique ID tag, the controller 402 may determine which particular ride vehicle is stopped at the platform 110. The controller 402 may also determine whether any seat rows of the determined ride vehicle are out-of-service. For example, the controller 402 may determine the existence of an out-of-service seat row based on the data input to the HMI 300 by the ride operator and/or technician and/or a direct communication from one or more sensors autonomously detecting an out-of-service triggering event of a ride vehicle seat resulting in an out-of-service seat row. Accordingly, when the controller 402 determines that a seat row of the ride vehicle stopped at the platform 110 is out-of-service, the controller 402 may instruct a shotgun gate corresponding to the out-of-service seat row to remain closed while instructing any shotgun gates corresponding to an in-service seat row to open. Consequently, this will prevent a passenger from being able to access the out-of-service seat.

As an example, the first ride vehicle 104 may be assigned a unique ID attribute 406 comprising a unique ID tag mounted to a surface of the first ride vehicle 104. Moreover, the second seat row 126 of the first ride vehicle 104 may be out-of-service and previously indicated as such in the HMI 300 by a ride operator/technician. When the first ride vehicle 104 arrives at the passenger loading platform 110, the ride vehicle identifier 404 (e.g., ID tag reader (e.g., RFID reader)) may read the unique ID attribute 406 (e.g., unique ID tag) as the unique ID attribute 406 (e.g., unique ID tag) enters a sensing range of the ride vehicle identifier 404, and the ride vehicle identifier 404 may transmit the data read from (e.g., transmitted from) the unique ID attribute 406 (e.g., unique ID tag) to the controller 402. Upon receiving the data read from the unique ID attribute 406 (e.g., unique ID tag), the controller 402 may determine that the first ride vehicle 104 is stopped at the platform 110 and may further determine whether any seat rows of the first ride vehicle 104 are out-of-service (e.g., by accessing the data input to the HMI 300). When the controller 402 determines that the second seat row 126 of the first ride vehicle 104 is out-of-service (e.g., as indicated in the HMI 300), the controller 402 may instruct the shotgun gate corresponding to the out-of-service second seat row 126 (e.g., the second shotgun gate 116) to remain closed while instructing the shotgun gate corresponding to the in-service first seat row 124 (e.g., the first shotgun gate 114) to open. This prevents a passenger (e.g., second passenger 112B) from being able to access the out-of-service second seat row while allowing a different passenger (e.g., first passenger 114) access to the in-service first row 124.

In an aspect, the controller 402 may instruct a shotgun gate corresponding to an out-of-service seat row (e.g., second shotgun gate 116) to remain closed by refraining to send a signal to open the shotgun gate (e.g., refraining to send an "open" signal). Additionally or alternatively, the controller 402 may block a signal for opening the shotgun gate upon learning that the shotgun gate is associated with an out-of-service seat row of a ride vehicle. Additionally or alternatively, the controller 402 may control a shotgun gate corresponding to an out-of-service seat row (e.g., second shotgun gate 116) to remain closed by sending a signal to keep the shotgun gate closed (e.g., sending a "do not open" signal).

Figure 5:
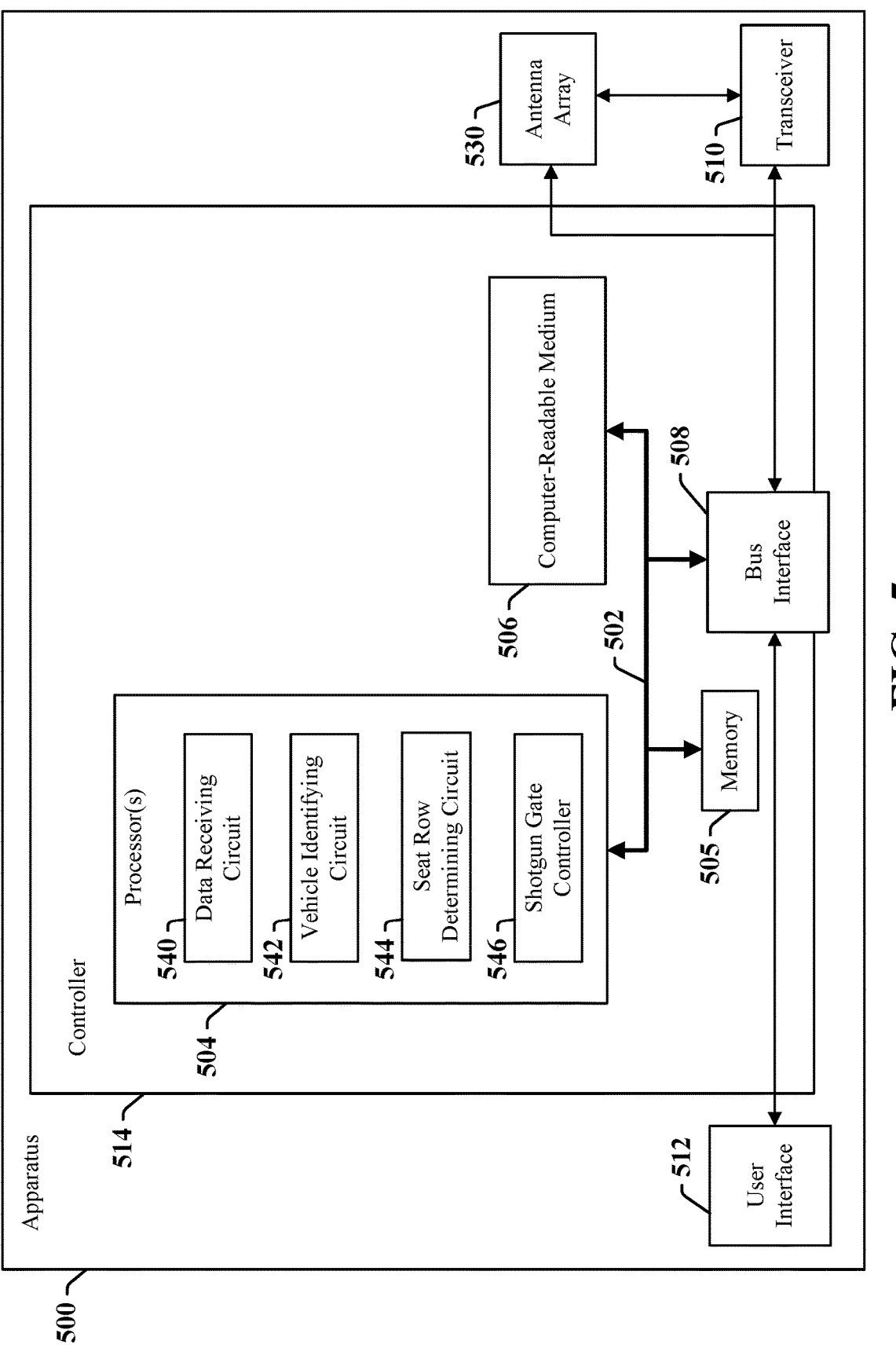
FIG. 5 is a block diagram illustrating an example of a hardware implementation for an exemplary apparatus employing a controller configured to control movement of a shotgun gate in a ride system in accordance with various aspects of the disclosure.

FIG. 5 is a block diagram illustrating an example of a hardware implementation for an exemplary apparatus 500 employing a controller 514 configured to control movement of a shotgun gate in a ride system. For example, the apparatus 500 may be a computer, workstation, laptop, tablet, mobile phone, or any other type of electronic device capable of communicating with and/or instructing other electronic devices. Moreover, the controller 514 may be the controller 402 shown in FIG. 4. The controller 514 may comprise one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 500 may be configured to perform any one or more of the functions described herein. That is, the processor 504, as utilized in an apparatus 500, may be used to implement any one or more of the processes and procedures described and illustrated in FIG. 6.

In this example, the controller 514 may be implemented with a bus architecture, represented generally by a bus 502.

The bus 502 may include any number of interconnecting buses and bridges depending on the specific application of the controller 514 and the overall design constraints. The bus 502 may communicatively couple together various circuits including one or more processors (represented generally by the processor 504), a memory 505, and/or computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 may provide a communication interface or means for communicating with various other apparatus over a transmission medium (e.g., via a wired connection and/or a wireless connection using an antenna array 530). For example, the transceiver 510 may provide a communication interface between the controller 514 and the ride vehicle identifier 404, the HMI 300, ride vehicle seats, seat restraint systems, sensors configured to autonomously detect an out-of-service triggering event of a ride vehicle seat, and/or any components of a ride vehicle capable of communication. Depending upon the nature of the apparatus, a user interface 512 (e.g., keypad, display, speaker, microphone, joystick) may also be provided. Of course, such a user interface 512 is optional, and may be omitted in some examples.

In some aspects of the disclosure, the processor 504 may include data receiving circuitry 540 configured for various functions, including, for example, receiving data corresponding to an identity of one or more ride vehicles prior to the one or more ride vehicles stopping at a passenger loading platform, wherein the data may indicate which seat row or rows of one or more seat rows is in-service or which seat row or rows of the one or more seat rows is out-of-service. For example, the data receiving circuitry 540 may be configured to implement one or more of the functions described below in relation to FIG. 6, including, e.g., block 602. The processor 504 may also include vehicle identifying circuitry 542 configured for various functions, including, for example, identifying the one or more ride vehicles stopped at the passenger loading platform, the one or more ride vehicles including the one or more seat rows and the passenger loading platform including one or more shotgun gates respectively corresponding to the one or more seat rows. For example, the vehicle identifying circuitry 542 may be configured to implement one or more of the functions described below in relation to FIG. 6, including, e.g., block 604. The processor 504 may also include seat row determining circuitry 544 configured for various functions, including, for example, determining which seat row or rows of the one or more seat rows is in-service and determining which seat row or rows of the one or more seat rows is out-of-service (e.g., based on the data corresponding to the identity of the one or more ride vehicles). For example, the seat row determining circuitry 544 may be configured to implement one or more of the functions described below in relation to FIG. 6, including, e.g., block 606. The processor 504 may also include a shotgun gate controller 546 configured for various functions, including, for example, instructing to remain closed at least one shotgun gate of the one or more shotgun gates corresponding to at least one seat row of the one or more seat rows determined to be out-of-service and/or instructing to open any other shotgun gate of the one or more shotgun gate corresponding to at least one other seat row of the one or more seat rows determined to be in-service. For example, the shotgun gate controller 546 may be configured to implement one or more of the functions described below in relation to FIG. 6, including blocks 608 and 610.

The processor 504 may be responsible for managing the bus 502 and general processing, including the execution of software stored on the computer-readable medium 506 and/or memory 505. The software, when executed by the processor 504, may cause the controller 514 to perform the various functions described below for any particular apparatus. The computer-readable medium 506 and/or the memory 505 may also be used for storing data that is manipulated by the processor 504 when executing software.

One or more processors 504 in the controller may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 506 and/or the memory 505. The computer-readable medium 506 and/or the memory 505 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 and/or the memory 505 may reside in the controller 514, external to the controller 514, or distributed across multiple entities including the controller 514. The computer-readable medium 506 and/or the memory 505 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 6:
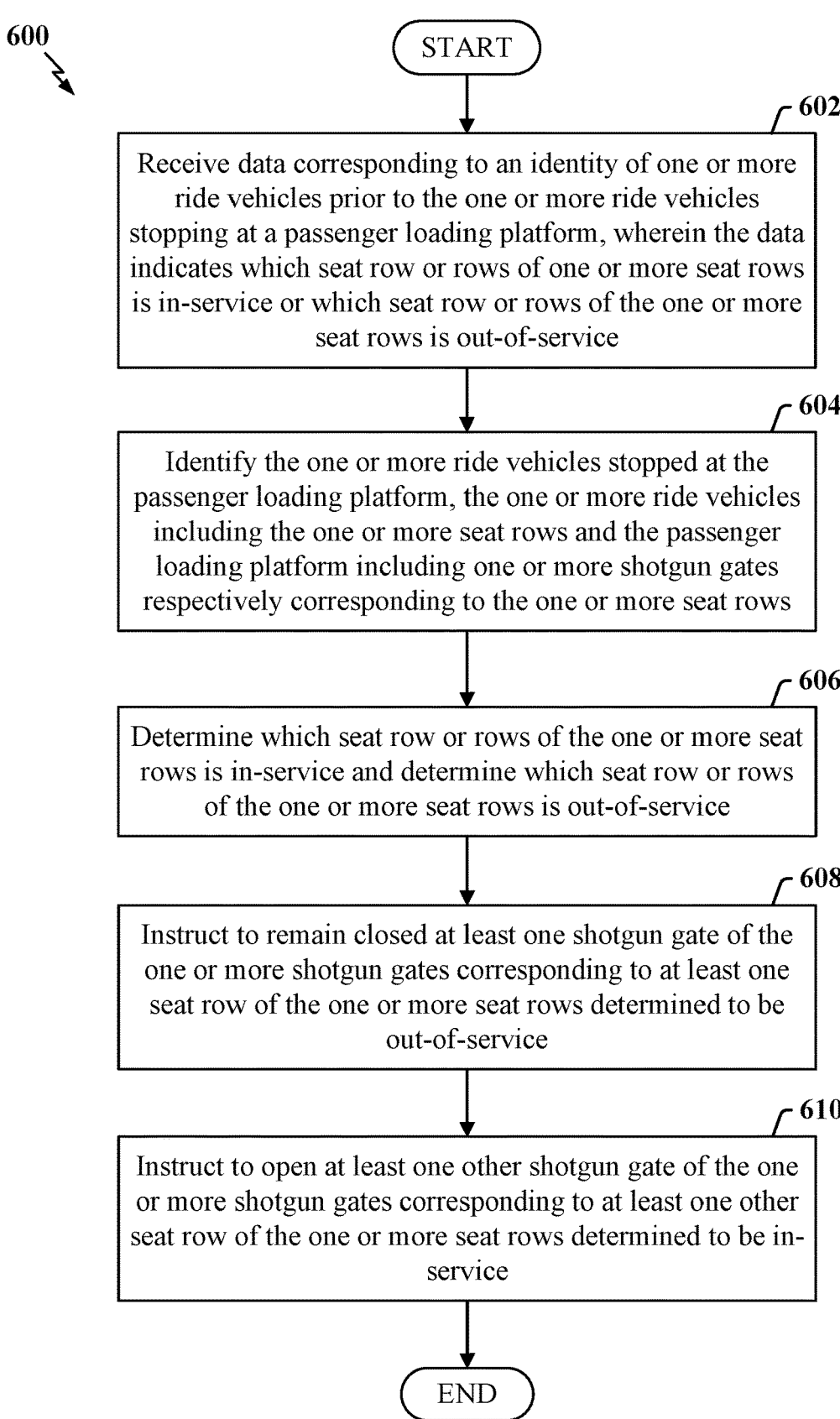
FIG. 6 is a flow chart illustrating an exemplary process for controlling movement of a shotgun gate in a ride system in accordance with aspects of the present disclosure.

FIG. 6 is a flow chart illustrating an exemplary process 600 for controlling movement of a shotgun gate in a ride system in accordance with aspects of the present disclosure. As described below, some or all illustrated features may be omitted in a particular implementation within the scope of the present disclosure, and some illustrated features may not be required for implementation of all aspects. In some examples, the process 600 may be carried out by the controller 514 of the apparatus 500 illustrated in FIG. 5, which may be a computer, workstation, laptop, tablet, mobile phone, or any other type of electronic device capable of communicating with and/or controlling (e.g., instructing) other electronic devices. In some examples, the process 600 may be carried out by any suitable apparatus or means for carrying out the functions or algorithm described below.

At block 602, the controller may receive data corresponding to an identity of one or more ride vehicles (e.g., first ride vehicle 104, second ride vehicle 106, and/or third ride vehicle 118) simultaneously to or prior to the one or more ride vehicles stopping at a passenger loading platform (e.g., passenger loading platform 110), wherein the data indicates which seat row or rows of one or more seat rows of the one or more ride vehicles is in-service or which scar row or rows of the one or more seat rows is out-of-service. In an aspect, the data is received via an interface device (e.g., HMI 300) configured to receive the data from a ride system operator or technician.

At block 604, the controller may identify the one or more ride vehicles stopped at the passenger loading platform. The one or more ride vehicles may include the one or more seat rows and the passenger loading platform may include one or more shotgun gates (e.g., first shotgun gate 114 and second shotgun gate 116) respectively corresponding to the one or more seat rows. In an aspect, the controller may identify data indicative of the identity of the one or more ride vehicles at least in part via a signal from a ride vehicle identifier (e.g., radio frequency identification (RFID) reader, bar code reader, QR code reader, camera, light sensor, and/or ride vehicle counter) configured to identify a unique identification attribute (e.g., unique ID tag (e.g., RFID tag, bar code, QR code), image, retroreflective pattern, color, light pulse pattern, and/or ride vehicle count) of the one or more ride vehicles.

At block 606, the controller may determine which seat row or rows of the one or more seat rows is in-service and determine which seat row or rows of the one or more rows is out-of-service (e.g., based on the data corresponding to the identity of the one or more ride vehicles). In an aspect, the controller may determine which seat row or rows is in-service or out-of-service by reading the received data corresponding to the identity of the one or more ride vehicles and/or receiving data indicative of an out-of-service triggering event from an on-board controller, seat row controller, or seat sensor system of the one or more ride vehicles.

At block 608, the controller may instruct to remain closed at least one shotgun gate of the one or more shotgun gates (e.g., second shotgun gate 116) corresponding to at least one seat row of the one or more seat rows determined to be out-of-service (e.g., second seat row 126). In an aspect, the one or more shotgun gates may be instructed to remain closed to prevent passengers from approaching and/or boarding an out-of-service row of the one or more ride vehicles. In an aspect, the controller may instruct the one or more shotgun gates to remain closed by refraining from sending a signal to open the one or more shotgun gates (e.g., refraining from sending an "open signal") and/or blocking a signal for opening the one or more shotgun gates from being sent (e.g., blocking an "open signal" from being sent). In an aspect, the controller controls (e.g., instructs) the one or more shotgun gates to remain closed by sending a signal to close the one or more shotgun gates (e.g., sending a "close signal").

At block 610, the controller may instruct to open any other shotgun gate of the one or more shotgun gates (e.g., first shotgun gate 114) corresponding to at least one other seat row of the one or more seat rows determined to be in-service (e.g., first seat row 124). In an aspect, the one or more other shotgun gates may be instructed to open to allow passengers to board an in-service row of the one or more ride vehicles.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. Moreover, the term "comprising," "including," "containing," or "having" is inclusive or open-ended and does not exclude additional, unrecited elements or method steps.

One or more of the components, steps, features and/or functions illustrated in FIGS. 1-6 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A ride system comprising:
   one or more ride vehicles including one or more seat rows;
   a passenger loading platform including one or more shotgun gates respectively corresponding to the one or more seat rows;
   a ride vehicle identifier configured to identify the one or more ride vehicles stopped at the passenger loading platform; and a controller communicatively coupled to the one or more shotgun gates and the ride vehicle identifier, the controller configured to:
   determine which seat row or rows of the one or more seat rows is in-service;
   determine whether at least one seat row of the one or more seat rows is out-of-service based on a weight requirement;
   determine whether at least one seat row of the one or more seat rows is out-of-service based on a maintenance requirement;
   instruct to remain closed at least one shotgun gate of the one or more shotgun gates corresponding to at least one seat row of the one or more seat rows determined to be out-of-service; and
   instruct to open any other shotgun gate of the one or more shotgun gates corresponding to at least one other seat row of the one or more seat rows determined to be in-service.

2. The ride system of claim 1, wherein the controller is further configured to:
   receive data corresponding to an identity of the one or more ride vehicles prior to the one or more ride vehicles stopping at the passenger loading platform, wherein the data indicates at least which seat row or rows of the one or more seat rows is in-service or which seat row or rows of the one or more seat rows is out-of-service.

3. The ride system of claim 2, further comprising:
   an interface device communicatively coupled to the controller,
   wherein the controller is configured to receive the data corresponding to the identity of the one or more ride vehicles via the interface device; and
   wherein the interface device is configured to receive the data corresponding to the identity of the one or more ride vehicles from a ride system operator or technician.

4. The ride system of claim 2, wherein the controller configured to determine which seat row or rows of the one or more seat rows is in-service or out-of-service is configured to at least:
   read the received data corresponding to the identity of the one or more ride vehicles;
   receive data indicative of an out-of-service triggering event from an on-board controller of the one or more ride vehicles;
   receive the data indicative of the out-of-service triggering event from a seat row controller of the one or more ride vehicles; or
   receive the data indicative of the out-of-service triggering event from a seat sensor system of the one or more ride vehicles.

5. The ride system of claim 1, wherein the ride vehicle identifier comprises a radio frequency identification (RFID) reader configured to identify the one or more ride vehicles, wherein the RFID reader is configured to:
   read an RFID tag mounted to the one or more ride vehicles.

6. The ride system of claim 1, wherein the controller configured to instruct to remain closed the one or more shotgun gates is configured to at least:
   refrain from sending a signal to open the one or more shotgun gates;
   block a signal for opening the one or more shotgun gates from being sent; or
   send a signal to close the one or more shotgun gates.

7. The ride system of claim 1, wherein the ride vehicle identifier comprises at least a radio frequency identification (RFID) reader, a barcode reader, a QR code reader, a camera, a light sensor, a color sensor, or a ride vehicle counter.

8. A method of controlling movement of a shotgun gate in a ride system, the method comprising:

identifying one or more ride vehicles stopped at a passenger loading platform, the one or more ride vehicles including one or more seat rows and the passenger loading platform including one or more shotgun gates respectively corresponding to the one or more seat rows;

determining which seat row or rows of the one or more seat rows is in-service;

determining whether at least one seat row of the one or more seat rows is out-of-service based on a weight requirement;

determining whether at least one seat row of the one or more seat rows is out-of-service based on a maintenance requirement;

instructing to remain closed at least one shotgun gate of the one or more shotgun gates corresponding to at least one seat row of the one or more seat rows determined to be out-of-service; and instructing to open any other shotgun gate of the one or more shotgun gates corresponding to at least one other seat row of the one or more seat rows determined to be in-service.

9. The method of claim 8, further comprising:

receiving data corresponding to an identity of the one or more ride vehicles prior to the one or more ride vehicles stopping at the passenger loading platform, wherein the data corresponding to the identity of the one or more ride vehicles indicates at least which seat row or rows of the one or more seat rows is in-service or which seat row or rows of the one or more seat rows is out-of-service.

10. The method of claim 9, wherein the data corresponding to the identity of the one or more ride vehicles is received via an interface device configured to receive the data corresponding to the identity from a ride system operator or technician.

11. The method of claim 9, wherein the determining which seat row or rows of the one or more seat rows is in-service or out-of-service comprises at least:

reading the received data corresponding to the identity of the one or more ride vehicles;

receiving data indicative of an out-of-service triggering event from an on-board controller of the one or more ride vehicles;

receiving the data indicative of the out-of-service triggering event from a seat row controller of the one or more ride vehicles; or receiving the data indicative of the out-of-service triggering event from a seat sensor system of the one or more ride vehicles.

12. The method of claim 8, wherein the identifying the one or more ride vehicles comprises:

identifying a unique identification attribute of the one or more ride vehicles.

13. The method of claim 8, wherein the instructing to remain closed the one or more shotgun gates comprises at least:

refraining from sending a signal to open the one or more shotgun gates;

blocking a signal for opening the one or more shotgun gates from being sent; or sending a signal to close the one or more shotgun gates.

14. The method of claim 8, wherein the identifying the one or more ride vehicles comprises identifying via at least a radio frequency identification (RFID) reader, a barcode reader, a QR code reader, a light sensor, a color sensor, a camera, or a ride vehicle counter.

15. An apparatus for controlling movement of a shotgun gate in a ride system, the apparatus comprising:

at least one processor, wherein the at least one processor is configured to:

identify one or more ride vehicles stopped at a passenger loading platform, the one or more ride vehicles including one or more seat rows and the passenger loading platform including one or more shotgun gates respectively corresponding to the one or more seat rows;

determine which seat row or rows of the one or more seat rows is in-service;

determine whether at least one seat row of the one or more seat rows is out-of-service based on a weight requirement;

determine whether at least one seat row of the one or more seat rows is out-of-service based on a maintenance requirement;

instruct to remain closed at least one shotgun gate of the one or more shotgun gates corresponding to at least one seat row of the one or more seat rows determined to be out-of-service; and instruct to open any other shotgun gate of the one or more shotgun gates corresponding to at least one other seat row of the one or more seat rows determined to be in-service.

16. The apparatus of claim 15, wherein the at least one processor is configured to:

receive data corresponding to an identity of the one or more ride vehicles prior to the one or more ride vehicles stopping at the passenger loading platform, wherein the data indicates at least which seat row or rows of the one or more seat rows is in-service or which seat row or rows of the one or more seat rows is out-of-service.

17. The apparatus of claim 16, wherein the at least one processor is configured to receive the data corresponding to the identity of the one or more ride vehicles via an interface device configured to receive the data corresponding to the identity of the one or more ride vehicles from a ride system operator or technician.

18. The apparatus of claim 16, wherein the at least one processor configured to determine which seat row or rows of the one or more seat rows is in-service or out-of-service is configured to at least:

read the received data corresponding to the identity of the one or more ride vehicles;

receive data indicative of an out-of-service triggering event from an on-board controller of the one or more ride vehicles;

receive the data indicative of the out-of-service triggering event from a seat row controller of the one or more ride vehicles; or receive the data indicative of the out-of-service triggering event from a seat sensor system of the one or more ride vehicles.

19. The apparatus of claim 15, wherein the at least one processor is configured to identify the one or more ride vehicles via a ride vehicle identifier configured to identify a unique identification attribute of the one or more ride vehicles.

20. The apparatus of claim 15, wherein the at least one processor configured to instruct to remain closed the one or more shotgun gates is configured to at least:

refrain from sending a signal to open the one or more shotgun gates;

block a signal for opening the one or more shotgun gates from being sent; or send a signal to close the one or more shotgun gates.

\* \* \* \* \*